United States Patent
Minneker, Jr.

(10) Patent No.: US 8,826,877 B2
(45) Date of Patent: Sep. 9, 2014

(54) FLEXIBLE MOUNTING SYSTEM FOR POWERTRAIN MOUNTED COMPONENTS

(75) Inventor: James C. Minneker, Jr., Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 702 days.

(21) Appl. No.: 12/579,480

(22) Filed: Oct. 15, 2009

(65) Prior Publication Data
US 2011/0088649 A1  Apr. 21, 2011

(51) Int. Cl.
*F02N 11/00* (2006.01)
*F02N 15/00* (2006.01)
*F16H 57/025* (2012.01)

(52) U.S. Cl.
CPC ........... *F02N 15/00* (2013.01); *F02N 15/006* (2013.01); *F16H 57/025* (2013.01); *Y10S 903/905* (2013.01); *Y10S 903/915* (2013.01)
USPC ....... 123/179.25; 903/905; 903/915; 248/639

(58) Field of Classification Search
CPC ... F02N 11/00; F02N 11/0859; F02N 15/006; F02N 15/066; F02N 15/02; F02N 15/06; F02N 15/062; F02N 15/067; F02N 2015/061; F02N 15/00; B60K 6/20; B60K 6/365; F16M 5/00; F16M 7/00; B60W 20/00; B60W 10/08; F16H 57/025
USPC .................. 123/179.25; 903/905, 915, 903; 248/639
See application file for complete search history.

(56) References Cited

U.S. PATENT DOCUMENTS

| | | | | |
|---|---|---|---|---|
| 3,249,391 A | * | 5/1966 | De Hart et al. | 384/294 |
| 3,304,134 A | * | 2/1967 | Allen | 384/432 |
| 3,526,146 A | * | 9/1970 | Harkness | 74/7 R |
| 3,772,938 A | * | 11/1973 | Johnson | 74/606 R |
| 4,135,478 A | * | 1/1979 | Rassey | 123/58.1 |
| 4,453,509 A | * | 6/1984 | Hayashi | 123/195 R |
| 4,458,640 A | * | 7/1984 | Shimada | 123/195 H |
| 4,553,442 A | * | 11/1985 | Mazzorana | 74/7 A |
| 4,569,109 A | | 2/1986 | Fetouh | |
| 4,651,691 A | * | 3/1987 | Ogawa | 123/195 H |
| 4,656,983 A | * | 4/1987 | Anno | 123/196 R |
| 4,684,267 A | * | 8/1987 | Fetouh | 384/294 |
| 4,690,112 A | | 9/1987 | Arnold | |
| 4,753,201 A | * | 6/1988 | Fukuo et al. | 123/195 R |
| 4,768,694 A | | 9/1988 | Fabris et al. | |

(Continued)

FOREIGN PATENT DOCUMENTS

| | | | |
|---|---|---|---|
| GB | 2288436 | * | 10/1995 |
| JP | 07103071 A | * | 4/1995 |
| JP | 11082259 A | * | 3/1999 |
| JP | 2000073858 A | * | 3/2000 |

*Primary Examiner* — Hai Huynh
*Assistant Examiner* — Raza Najmuddin
(74) *Attorney, Agent, or Firm* — Cantor Colburn LLP

(57) ABSTRACT

A mounting system for powertrain components requiring axial installation and radial removal thereof is provided. A mounting flange is integrally cast with a powertrain component and extends outwardly therefrom. An opening extends through the mounting flange defining a mounting flange axis and axially receives a portion of a powertrain component for support therein, and by the mounting flange. A separation line extends diametrically across the mounting flange to define a separated portion and a remaining portion of the mounting flange. Fasteners are configured to removeably attach the separated portion to the remaining portion to thereby facilitate removal of the powertrain component from the powertrain assembly in a radial direction.

11 Claims, 5 Drawing Sheets

(56) References Cited

U.S. PATENT DOCUMENTS

| | | | |
|---|---|---|---|
| 5,072,704 A * | 12/1991 | Webb | 123/179.1 |
| 5,095,865 A * | 3/1992 | Keister | 123/179.5 |
| 5,207,195 A * | 5/1993 | McClintic | 123/179.25 |
| 5,566,449 A * | 10/1996 | Okamoto et al. | 29/888.092 |
| 6,145,574 A | 11/2000 | Luchner et al. | |
| 6,450,310 B1 * | 9/2002 | Catrinta | 192/13 R |
| 6,499,446 B1 * | 12/2002 | Rao et al. | 123/48 B |
| 6,543,405 B2 * | 4/2003 | Sachdev et al. | 123/195 R |
| 6,622,669 B1 * | 9/2003 | Nageswar Rao et al. | 123/48 B |
| 6,722,860 B2 * | 4/2004 | Asano | 417/360 |
| 6,875,154 B2 * | 4/2005 | Mitsutani et al. | 477/107 |
| 7,328,681 B2 * | 2/2008 | Tidwell | 123/195 R |
| 7,594,490 B2 * | 9/2009 | Ono | 123/179.24 |
| 7,654,132 B2 * | 2/2010 | Birk et al. | 73/114.16 |
| 7,661,404 B2 * | 2/2010 | Lu | 123/179.25 |
| 8,235,020 B2 * | 8/2012 | Kashiwabara | 123/179.25 |
| 8,245,681 B2 * | 8/2012 | Wanner et al. | 123/179.25 |
| 2002/0066607 A1 * | 6/2002 | Levin | 180/65.2 |
| 2003/0075368 A1 * | 4/2003 | Takaoka et al. | 180/65.2 |
| 2004/0149247 A1 * | 8/2004 | Kataoka et al. | 123/179.4 |
| 2004/0177824 A1 * | 9/2004 | Decuir | 123/192.2 |
| 2005/0245349 A1 * | 11/2005 | Tabata et al. | 477/3 |
| 2006/0104556 A1 * | 5/2006 | Tidwell | 384/294 |
| 2006/0131085 A1 * | 6/2006 | Tamai | 180/65.2 |
| 2007/0081748 A1 * | 4/2007 | Sitter | 384/294 |
| 2007/0261659 A1 * | 11/2007 | Tidwell | 123/197.4 |
| 2009/0159038 A1 * | 6/2009 | Koyama et al. | 123/195 A |
| 2009/0255741 A1 * | 10/2009 | Major et al. | 180/65.22 |
| 2009/0280941 A1 * | 11/2009 | Dusenberry et al. | 475/5 |
| 2010/0024757 A1 * | 2/2010 | Kashiwabara | 123/179.25 |

\* cited by examiner

FLEXIBLE MOUNTING SYSTEM FOR POWERTRAIN MOUNTED COMPONENTS

FIELD OF THE INVENTION

Exemplary embodiments of the present invention are directed to a system for mounting components to a powertrain assembly and, more particularly, to an apparatus providing for multidirectional assembly and removal of such components.

BACKGROUND OF THE INVENTION

Increasingly stringent regulations for fuel economy, emissions and safety have driven the design of vehicle powertrain assemblies towards increased complexity while smaller design driven vehicle architectures provide smaller packaging envelopes for the engine and transmission. One factor that may be negatively impacted by complex packaging of a powertrain assembly (ex. engine, transmission and related components) in a vehicle is post assembly serviceability of components and accessories. Most components must be very accurately mounted to the powertrain in order to operate properly. A starter, for example, requires precise axial and radial alignment with respect to the engine crankshaft axis and the toothed outer circumference of the flywheel, respectively, in order for the starter gear to precisely engage and turn the flywheel during the engine starting mode. A mounting flange may be integrally cast with the engine block or the transmission bell housing in order to provide a precise mounting position. In the case of the starter, the mounting flange typically extends outwardly from the flywheel-end of the engine block, or the transmission bell housing, and includes an opening through which the geared end of the starter passes when it is mounted thereto. The axis of the flange opening extends in parallel to the crankshaft axis and it is in the direction of this axis that the starter motor is mounted during assembly of the powertrain.

Following assembly of the powertrain and its installation into a motor vehicle, any servicing of the starter will require removal of the component by moving it axially along the axis of the flange opening until the geared end of the starter motor clears the mounting flange. In some instances such axial movement of the starter may be prevented due to interference of a vehicle structural member or the existence of another powertrain component mounted closely adjacent thereto. Such interference situations may necessitate the removal of components not requiring servicing or movement of the powertrain assembly in order to effect removal of the service item.

SUMMARY OF THE INVENTION

In one exemplary embodiment of the invention, a mounting system for powertrain components requiring axial installation and radial removal thereof is provided. The mounting system comprises a powertrain assembly having an integrally cast mounting flange that extends outwardly therefrom. An opening extends through the mounting flange defining a mounting flange axis and has an inner circumference configured to axially receive a portion of a powertrain component for support therein, and by the mounting flange. A separation line extends diametrically across the mounting flange to define a separated portion and a remaining portion of the mounting flange. Fasteners are configured to removeably attach the separated portion to the remaining portion to thereby facilitate removal of the powertrain component from the powertrain assembly in a direction that extends radially from the mounting flange axis.

In another exemplary embodiment of the invention, an engine assembly having a starter motor requiring axial installation and radial removal thereof, comprises a cylinder block, a mounting flange integrally cast with the cylinder block and extending outwardly therefrom. The mounting flange has an opening, defining a mounting flange axis, extending therethrough. The opening has an inner circumference configured to axially receiving a portion of the starter motor for support therein, and by the mounting flange. A separation line extends diametrically across the outwardly extending mounting flange to define a separated portion and a remaining portion of the mounting flange. Fasteners are configured to removeably attach the separated portion to the remaining portion to thereby facilitate radial removal of the starter motor from the cylinder block.

The above features and advantages and other features and advantages of the present invention are readily apparent from the following detailed description of the invention when taken in connection with the accompanying drawings.

BRIEF DESCRIPTION OF THE DRAWINGS

Other objects features, advantages and details appear, by way of example only, in the following detailed description of embodiments, the detailed description referring to the drawings in which.

DESCRIPTION OF THE EMBODIMENTS

Figures 1, 1A:
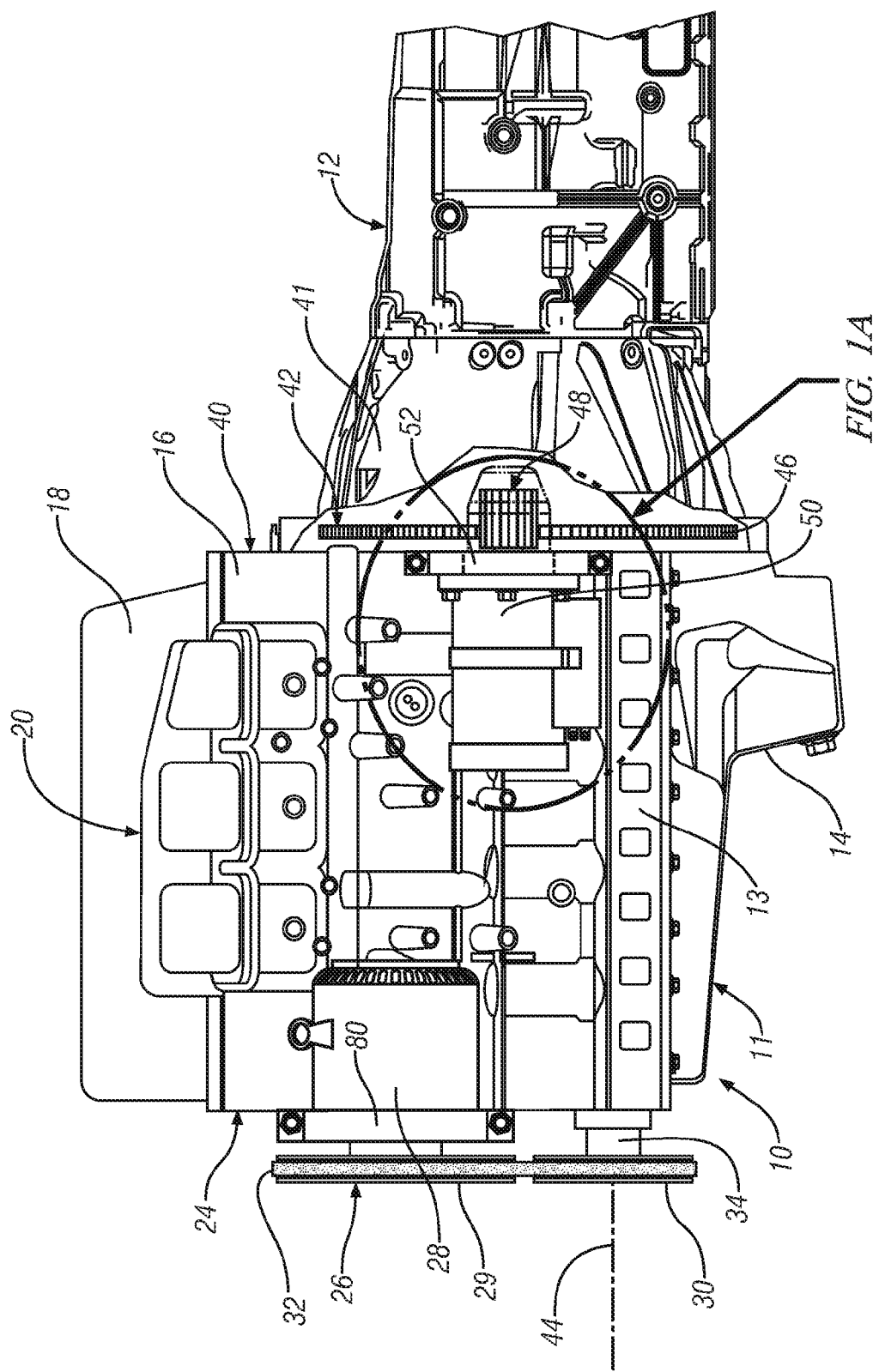
FIG. 1 is a partially sectioned, side view of a powertrain assembly, including an internal combustion engine and a transmission, embodying features of the invention.
FIG. 1A is an enlarged view of a portion of the powertrain assembly of FIG. 1.
Figure 1A:
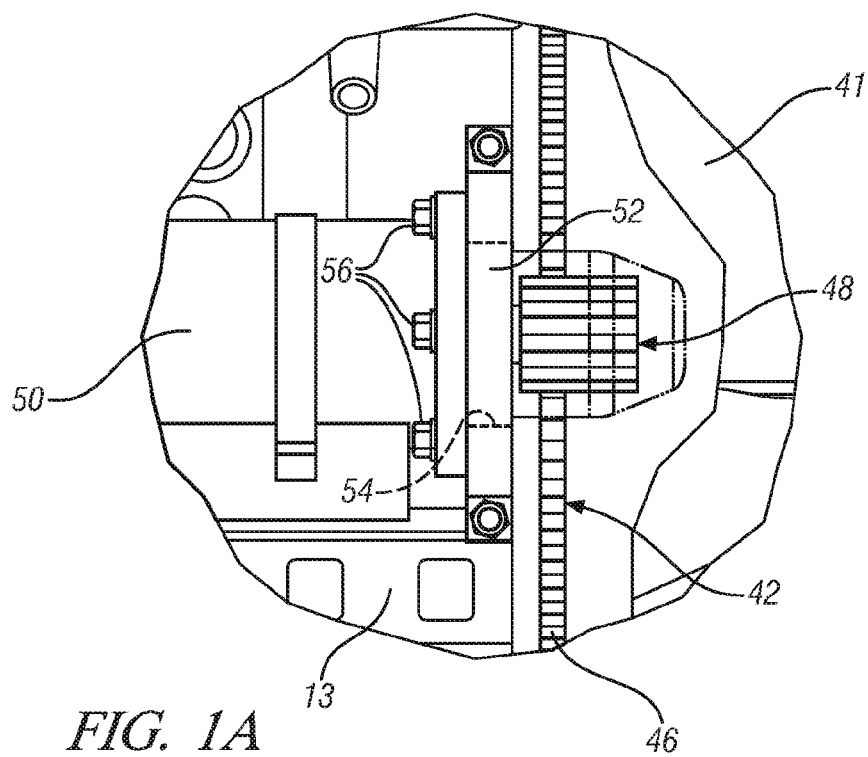

The following description is merely exemplary in nature and is not intended to limit the present disclosure, application or uses. It should be understood that throughout the drawings, corresponding reference numerals indicate like or corresponding parts and features.

Referring to FIG. 1, there is shown a side, or longitudinal view of a powertrain assembly 10 that includes an internal combustion engine 11 and an associated transmission 12. The internal combustion engine 11 includes a cylinder block 13 that is typically constructed of cast iron or a lighter weight alloy such as aluminum. The lower end of the cylinder block 13 is closed by an oil pan 14 while the upper end is closed by one or more cylinder heads 16 and valve covers 18, depending upon the configuration of the engine 11. A combustion air intake system referred to generally as 20 and a fuel system (not shown) supply combustion air and fuel to combustion chambers (not shown).

At a first end 24 of the internal combustion engine 11, an accessory drive system 26 includes such components as an air conditioner compressor 28 (other components (not shown) may include a power steering pump, an air pump, a water pump, etc.). The components such as air conditioner compressor 28 include a driven pulley 29 that is rotatably driven by a crankshaft pulley 30, fixed to one end of a crankshaft 34 through one or more drive belts 32 extending therebetween. At a second end 40 of the internal combustion engine 11, a flanged surface is configured for mating with the bell housing 41 of transmission 12. Attached to a second end of the crankshaft 34 and located closely adjacent to the second end 40 of the internal combustion engine 11 is a toothed flywheel 42 that is configured for rotation about the axis 44 of the crankshaft 34 when the engine 10 is operating. As indicated by its name, the toothed flywheel 42 includes a flywheel ring gear 46 comprising a series of gear teeth that extend about the outer circumference thereof. The gear teeth of the flywheel ring gear 46 are configured to engage with corresponding gear teeth of a starter drive pinion gear 48 of an engine mounted starter motor 50 when the starter motor is in a cranking mode, as illustrated in FIGS. 1 and 1A, to start the internal combustion engine 10.

Figure 2A:
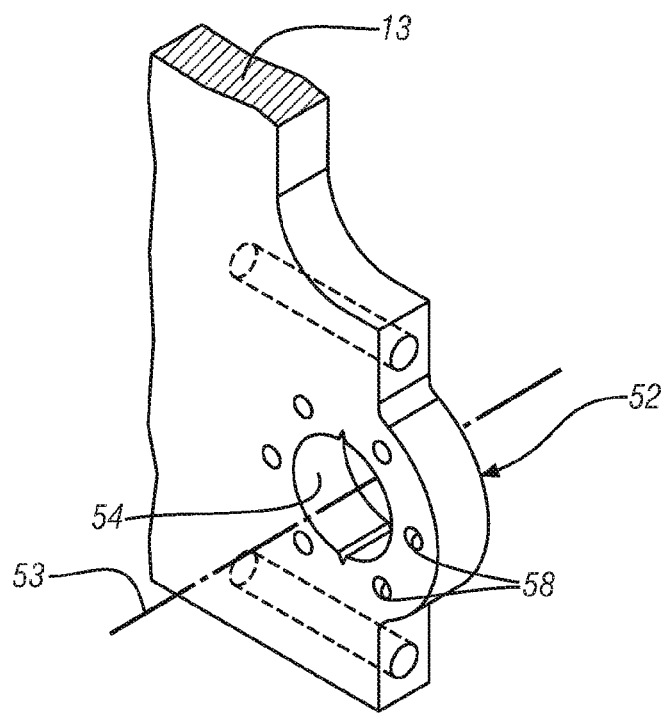
FIGS. 2A-2C illustrate a mounting flange for powertrain components that embodies features of the invention.
Figure 2B:
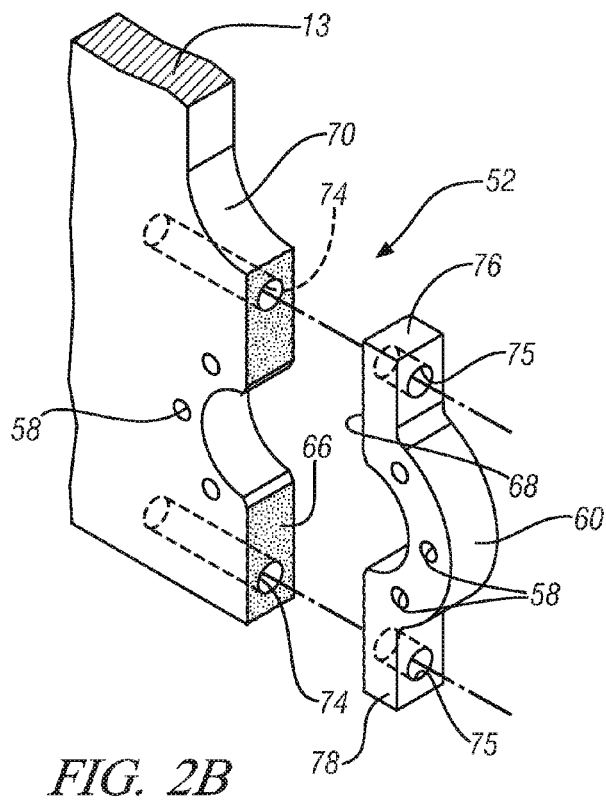
Figure 2C:
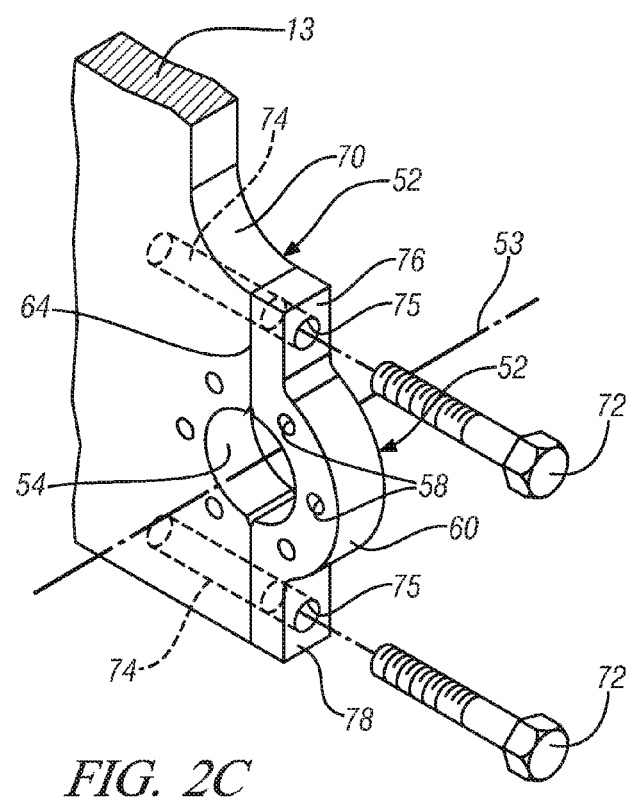

As illustrated in FIGS. 1 through 2C, in an exemplary embodiment, the starter motor 50 is mounted to the powertrain assembly using a mounting system including mounting flange 52 that positions the starter motor in precise axial and radial alignment with the crankshaft axis 44 and flywheel 42 to facilitate the smooth engagement of the starter drive pinion gear 48 with the gear teeth of the flywheel ring gear 46 during operation of the starter motor 50. The starter motor 50 mounts through an opening 54 in the mounting flange 52 using fasteners such as mounting bolts 56 that engage threaded bores 58, or other suitable apparatus for fixing the unit to the mounting flange 52. To insure precise alignment of the mounted starter motor 50, the mounting flange 52 may be integrally cast with the cylinder block 13 during casting thereof and the opening 54 defines a mounting flange axis 53 that extends in parallel to the crankshaft axis 44 of the internal combustion engine 11.

In an exemplary embodiment, following the casting of the cylinder block 13, a portion of the the starter mounting flange 52 is separated from the casting resulting in the separation of a portion 60 of the flange, FIGS. 2B-C, from the cylinder block 13. As illustrated, the separated portion 60 represents approximately half of the inner circumference of the opening 54 of the starter mounting flange 52. In an exemplary embodiment, the separation of the flange portion 60 is achieved through a fracturing process that results in a separation or fracture line 64 that extends approximately diametrically across the outwardly extending mounting flange 52, normal to the flange axis 53. The separation or fracture line 64 between the separated portion 60 and a remaining fixed portion 70, that remains integral with the cylinder block 13, is defined by first and second mating surfaces 66 and 68. When separated using a fracture process, the first and second mating surfaces 66 and 68, respectively, are mirror images of each other and provide for the precise reassembly of the separated portion 60 to the remaining fixed portion 70 of the starter mounting flange 52. Reassembly may be achieved using fasteners such as mounting bolts 72 that pass through bores 75 in first and second ends 76 and 78 of the removable portion 60 to engage threaded bores 74 that are machined into the cylinder block 13. Other suitable fastener assemblies or methods may also be used to reassemble the separated portion 60 to the fixed portion 70. The process used to fracture the starter mounting flange 52 may be any suitable method such as, for instance, the method described in U.S. Pat. No. 4,569,109, issued Feb. 11, 1986 and entitled Method of Making a Split Bearing Assembly. Following reassembly of the separated portion 60 of the mounting flange 52 to the cylinder block 13, the mounting flange 52 is again configured to axially receive the starter motor 50 for precise mounting and alignment with respect to the crankshaft axis 44 and the flywheel 42. It is contemplated that a process other than fracturing may be utilized to remove the separated portion 60 from the fixed portion 70. For instance the separation line 64 may be defined by precise cutting or other suitable manner of machine removal that will provide similarly close tolerances as the described fracture process.

Figure 3A:
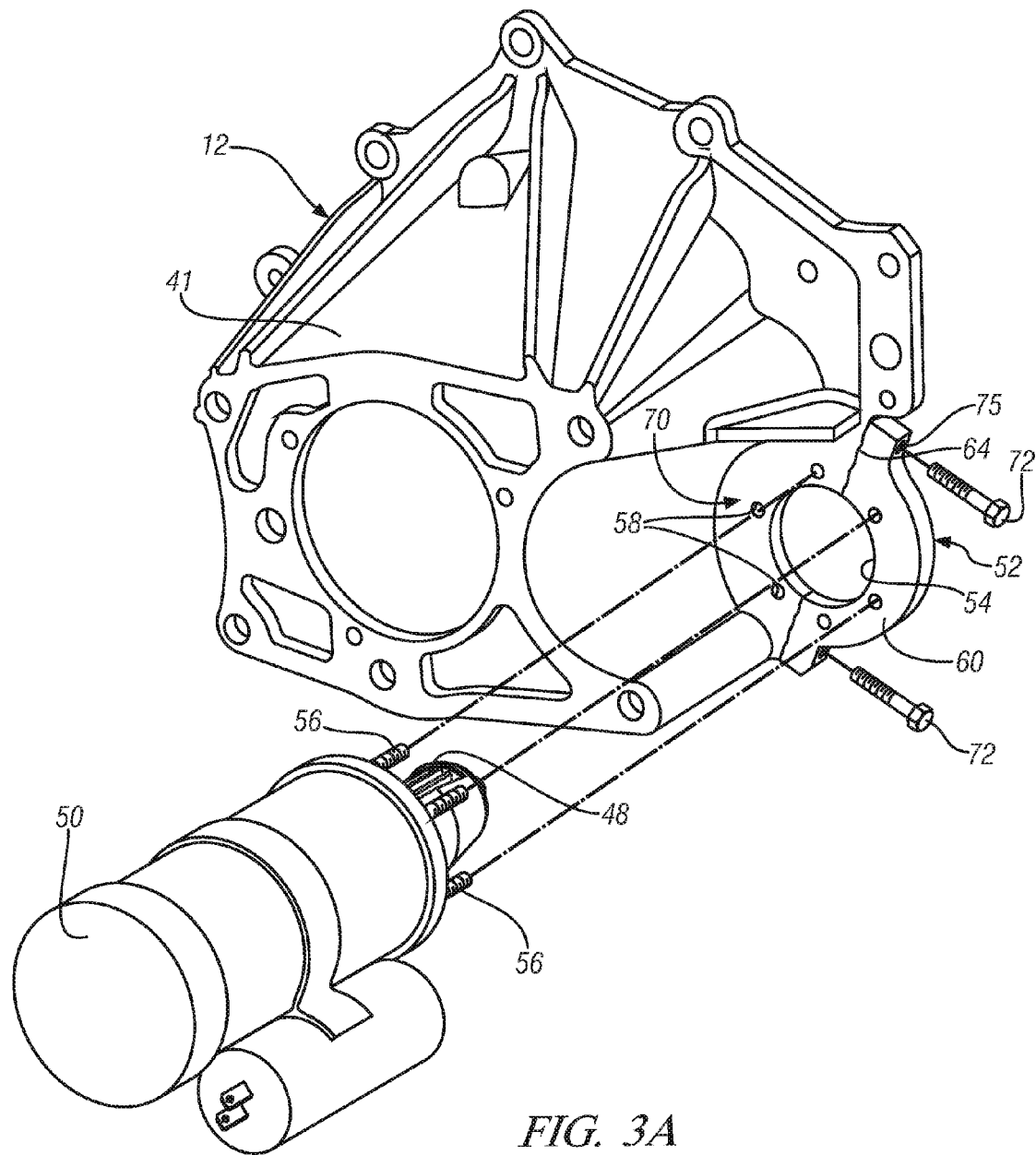
FIGS. 3A-3C illustrates a transmission component mounting system embodying features of the invention.
Figure 3B:
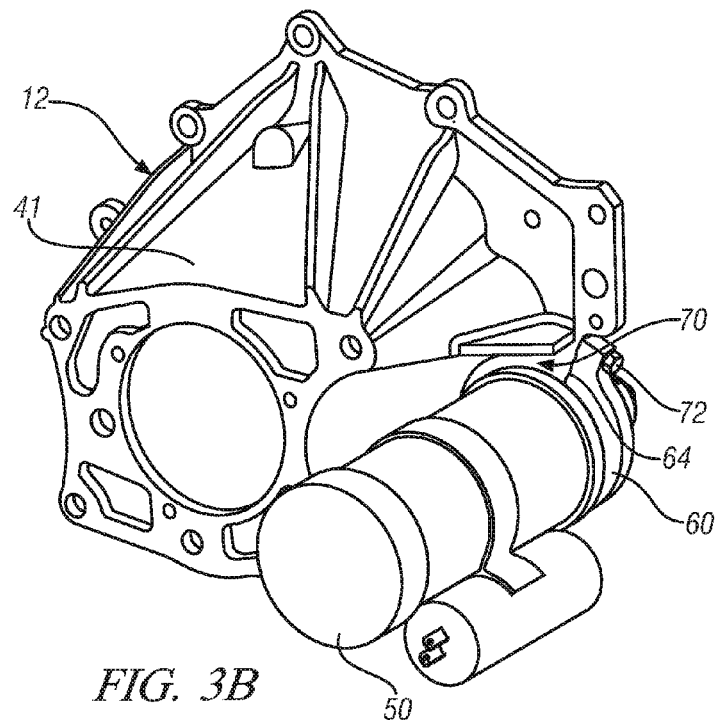
Figure 3C:
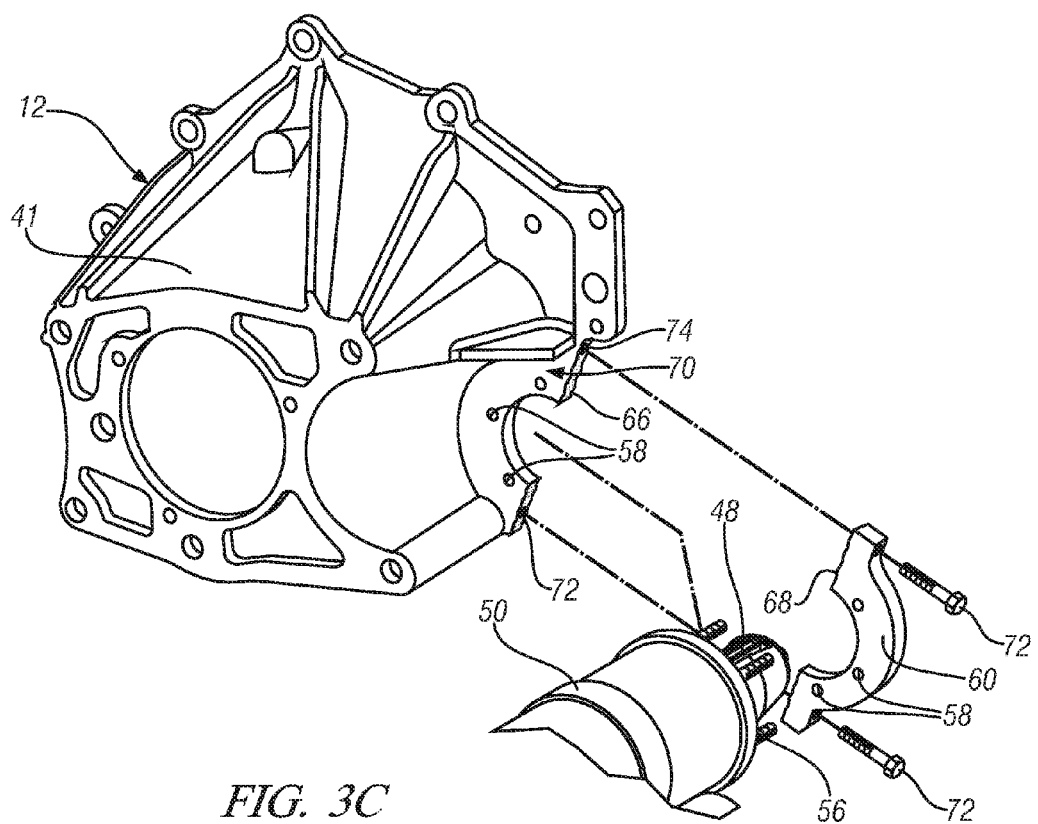

In an exemplary embodiment illustrated in FIGS. 3A-C, an instance in which removal of an accessory, such as starter motor 50 is required, is illustrated. Axial movement of the starter motor (in this case in order for the starter drive pinion gear 48 to clear the starter mounting flange 52) may not be feasible due to interference issues. In such a case, the starter motor mounting bolts 56 may be removed from their threaded bores 58 in the mounting flange 52, followed by the removal of the mounting bolts 72 that retain the removable portion 60 in engagement with the fixed portion 70. In this manner, the removable portion 60 may be removed from, in this case the transmission bell housing 41 and from around the starter drive pinion gear 48. The embodiment shown in FIG. 3C, provides for the removal of the starter motor 50 from the flange 52 in a direction that is generally normal to the flange axis 53 (i.e. in a latitudinal direction rather than in an axial direction.)

While the description provided herein has been primarily directed to the mounting of a starter motor 50 to the cylinder block 13 or the bell housing 41 of powertrain assembly 10, such description has been for simplification rather than limitation. It is contemplated that the invention has application to the mounting and removal of any powertrain mounted or other, similar components that require precise axial alignment but are limited by packaging or other constraints from axial movement once assembled into a motor vehicle or the like. As one example, it is contemplated that such a mounting flange 80, FIG. 1, may be associated with the accessory drive system 26 for precise mounting and alignment of pulley driven components such as air conditioner compressor 28 with respect to the crankshaft axis 44 and, more importantly, the crankshaft pulley 30. Additionally, while the description provided herein has been primarily directed to powertrain assemblies, including piston-type internal combustion engines and transmissions intended primarily for vehicular applications, it is also contemplated that the present invention may have applications to other types and styles of engines as well as non-engine applications.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A mounting system for powertrain components requiring axial installation and radial removal thereof, comprising;
   a powertrain assembly comprising a cylinder block;
   a mounting flange integrally cast with the cylinder block and extending outwardly from an outer surface of the cylinder block;
   an opening extending through the mounting flange, defining a mounting flange axis, and having an inner circumference configured to axially receive a portion of a powertrain component, for support therein by the mounting flange;
   a plurality of bores positioned on the mounting flange and extending substantially parallel to the mounting flange axis;

a fracture line formed by a fracturing process performed on the mounting flange, the fracture line extending diametrically across the mounting flange, to thereby define a separated portion and a remaining portion of the mounting flange; and fasteners to removeably attach the separated portion to the remaining portion to facilitate removal of the powertrain component from the powertrain assembly in a direction that extends radially from the mounting flange axis.

2. The mounting system for powertrain components requiring axial installation and radial removal thereof of claim 1, said powertrain assembly further comprising, a transmission housing.

3. The mounting system for powertrain components requiring axial installation and radial removal thereof of claim 1, wherein the fracture line defines first and second, mirror image mating surfaces at the interface of the separated portion and the remaining portion of the mounting flange.

4. The mounting system for powertrain components requiring axial installation and radial removal thereof of claim 2, wherein the mounting flange is located adjacent one end of the cylinder block and the powertrain component is an engine starter motor configured to engage a flywheel that is mounted for rotation on a crankshaft disposed in the cylinder block.

5. The mounting system for powertrain components requiring axial installation and radial removal thereof of claim 4, wherein the engine starter motor is positioned by the mounting flange in axial alignment with an axis of the crankshaft and radially with a perimeter of the flywheel.

6. A mounting system for powertrain components requiring axial installation and radial removal thereof, the mounting system comprising:

a powertrain assembly comprising mission housing;

a mounting flange integrally cast with the powertrain assembly and extending outwardly therefrom;

an opening extending through the mounting flange, defining a mounting flange axis, and having an inner circumference configured to axially receive a portion of a powertrain component, for support therein by the mounting flange;

a plurality of bores positioned on the mounting flange and extending substantially parallel to the mounting flange axis;

a separation line extending diametrically across the mounting flange, to thereby define a separated portion and a remaining portion of the mounting flange; and fasteners to removably attach the separated portion to the remaining portion to facilitate removal of the powertrain component from the powertrain assembly in a direction that extends radially from the mounting flange axis, wherein the mounting flange is located adjacent one end of the transmission housing and the powertrain component is an engine starter motor configured to engage a flywheel that is mounted for rotation on a crankshaft disposed in the cylinder block.

7. The mounting system for powertrain components requiring axial installation and radial removal thereof of claim 6, wherein the engine starter motor is positioned by the mounting flange in axial alignment with an axis of the crankshaft and radially with a perimeter of the flywheel.

8. The mounting system for powertrain components requiring axial installation and radial removal thereof of claim 2, wherein the mounting flange is located adjacent one end of the cylinder block and the powertrain component is configured to engage an accessory drive system that is rotatably driven by a crankshaft disposed in the cylinder block.

9. The mounting system for powertrain components requiring axial installation and radial removal thereof of claim 8, the accessory drive system further comprising:

a crankshaft pulley mounted for rotation at an end of the crankshaft;

a driven pulley mounted for rotation to the powertrain component; and a drive belt extending between the crankshaft pulley and the driven pulley and configured to drive the driven pulley and the associated component.

10. A mounting system for powertrain components requiring axial installation and radial removal thereof, the mounting system comprising:

a powertrain assembly comprising a transmission housing and a cylinder block;

a mounting flange integrally cast with the powertrain assembly and extending outwardly therefrom;

an opening extending through the mounting flange, defining a mounting flange axis, and having an inner circumference configured to axially receive a portion of a powertrain component, for support therein by the mounting flange;

a separation line extending diametrically across the mounting flange, to thereby define a separated portion and a remaining portion of the mounting flange; and fasteners to removably attach the separated portion to the remaining portion to facilitate removal of the powertrain component from the powertrain assembly in a direction that extends radially from the mounting flange axis, wherein the mounting flange is located adjacent one end of the transmission housing and the powertrain component is an engine starter motor configured to engage a flywheel that is mounted for rotation on a crankshaft disposed in the cylinder block.

11. The mounting system for powertrain components requiring axial installation and radial removal thereof of claim 2, wherein the mounting flange is located adjacent one end of the transmission housing and the powertrain component is an engine starter motor configured to engage a flywheel that is mounted for rotation on a crankshaft disposed in the cylinder block.

* * * * *